(12) United States Patent
Mitevski et al.

(10) Patent No.: US 10,540,201 B2
(45) Date of Patent: Jan. 21, 2020

(54) SYSTEMS AND METHODS FOR TASK PROCESSING IN A DISTRIBUTED ENVIRONMENT

(71) Applicant: VMware, Inc., Palo Alto, CA (US)

(72) Inventors: Miroslav Mitevski, Sofia (BG); Zhan Ivanov, Sofia (BG); Tina Nakova, Sofia (BG); Ivan Strelkov, Sofia (BG); Nikola Atanasov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 169 days.

(21) Appl. No.: 15/664,207

(22) Filed: Jul. 31, 2017

(65) Prior Publication Data

US 2019/0034224 A1    Jan. 31, 2019

(51) Int. Cl.
*G06F 9/455* (2018.01)
*G06F 9/48* (2006.01)
*H04L 29/06* (2006.01)
*H04L 29/08* (2006.01)

(52) U.S. Cl.
CPC .......... *G06F 9/4843* (2013.01); *G06F 9/4555* (2013.01); *G06F 9/45554* (2013.01); *G06F 9/45558* (2013.01); *H04L 63/00* (2013.01); *H04L 63/083* (2013.01); *H04L 63/0815* (2013.01); *H04L 67/02* (2013.01); *H04L 67/10* (2013.01); *H04L 67/42* (2013.01); *H04L 69/324* (2013.01)

(58) Field of Classification Search
None
See application file for complete search history.

*Primary Examiner* — Gregory A Kessler
(74) *Attorney, Agent, or Firm* — Hanley, Flight and Zimmerman, LLC

(57) ABSTRACT

Methods and apparatus for task processing in a distributed environment are disclosed and described. An example apparatus includes a task manager and a task dispatcher. The example task manager is to receive a task and create an execution context for the task, the execution context to associate the task with a routine for task execution. The example task dispatcher is to receive a report of task execution progress and provide an update regarding task execution progress, the task dispatcher, upon initiation of task execution, to facilitate blocking of interaction with a resource involved in the task execution. The example task dispatcher is to trigger an indication of task execution progress and, upon task finish, facilitate unblocking of the resource involved in the task execution.

20 Claims, 12 Drawing Sheets

SYSTEMS AND METHODS FOR TASK PROCESSING IN A DISTRIBUTED ENVIRONMENT

FIELD OF THE DISCLOSURE

The present disclosure relates generally to cloud computing and, more particularly, to methods and apparatus for task processing in a distributed environment such as a cloud computing environment.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

DETAILED DESCRIPTION

Figure 1:
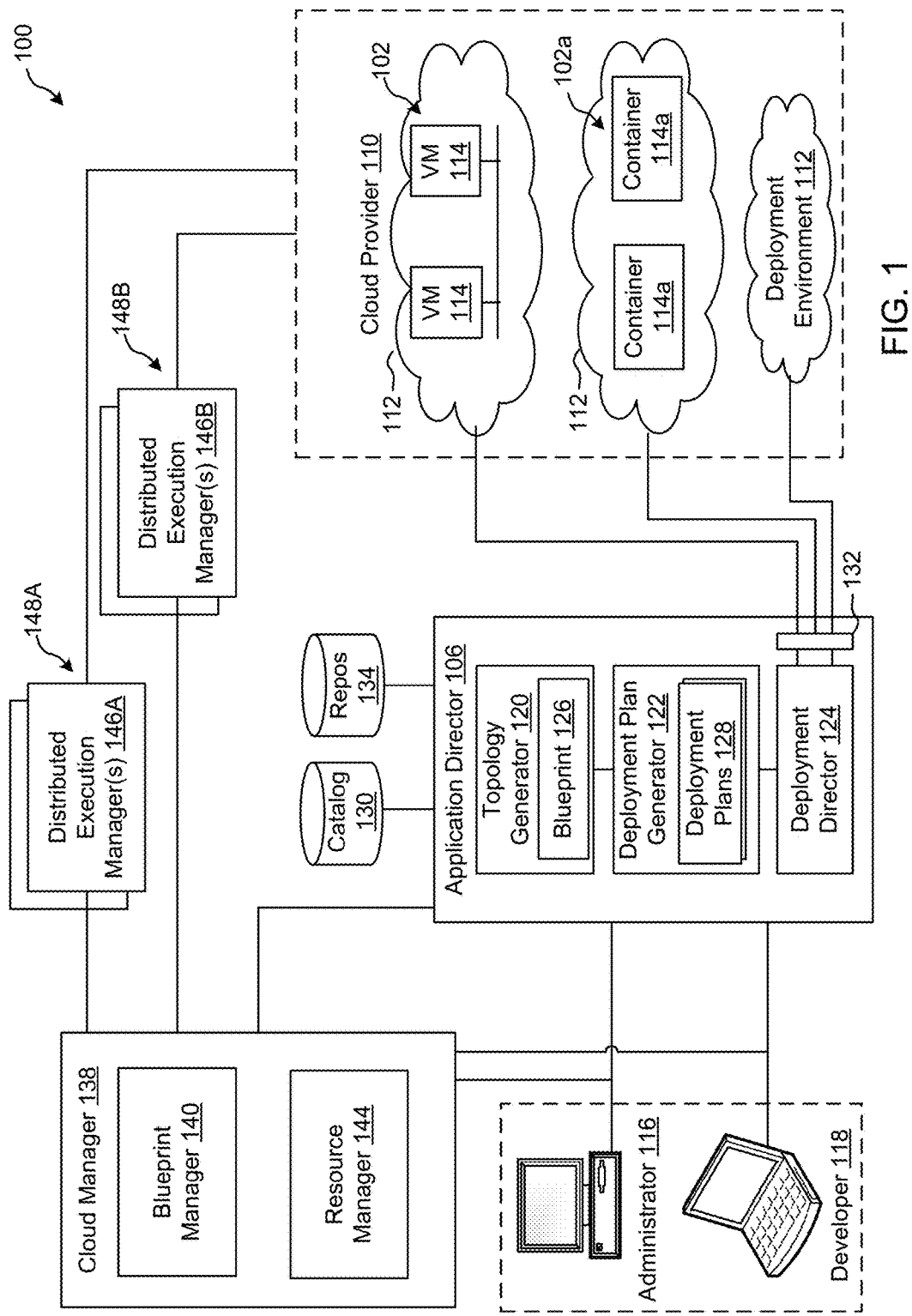
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, which is hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Example Systems and Methods for Service Configuration

Configuring services in distributed systems, such as the example system 100, involves updating a configuration, restarting affected services, and evaluating whether the service is operational with the changed configuration data. When such tasks are performed through a Web-based interface, a user and/or other requesting application, system, machine, etc., receives information about a result of the task execution when the Web-based (e.g., hypertext transfer protocol (HTTP), etc.) request ends, for example. In cases in which the execution of such tasks takes a long time (e.g., several minutes), the distributed system can be left in a broken state as the system and/or its various components await task completion. For example, several users from different remote machines can be performing (or trying to perform) configuration tasks simultaneously (or substantially simultaneously given a data transmission, storage, and/or processing delay) and can potentially conflict in usage of resources, data, dependency, etc. Alternatively or in addition, a connection from a user's web browser to a remote web interface can be terminated before the user realizes whether or not an executing operation/task was successful. Further, a user may not be certain whether he or she is the only user operating the system, for example. A result of an operation can be influenced by another request that is triggered from another client, for example. During task/operation execution, the user is not able to see how the task is progressing and an expected time of task completion until the task ends.

In a cloud resource management system, such as VMware's vRA®, for example, long-running operations can include replacing a secure sockets layer (SSL) certificate for vRA, configuring a single sign-on (SSO) server, joining a cluster, promoting a new master database (e.g., a Master PostgreSQL database, etc.), etc.

Certain examples provide a framework to manage execution of long-running tasks across hosts in a virtual computing environment. An example framework includes a task endpoint, a task, an execution context, a task manager, a task dispatcher, and a client. The example task endpoint accepts tasks submitted (e.g., through REST calls, etc.) and provides access (e.g., through WebSocket, etc.) to the task dispatcher. The example task is a separate thread (or Go routine, in context of vRA implementation, etc.). The task represents work that should be performed. For each task, an execution context is created. The example execution context holds information about data associated with the task and information about progress of the task execution. The execution context provides a messaging layer, which allows the task to notify the task dispatcher about the progress of the task execution and to send feedback to a user and/or other system. The example task manager processes tasks submitted for execution. When a new task is submitted, the task manager is responsible to create an execution context, associate a thread/Go routine with the task and to connect the execution context with the task dispatcher. The example task dispatcher receives messages from the tasks sent through the execution context and distributes messages to clients (e.g., the user's browser, etc.) connected to the system (e.g., through WebSocket, etc.). The example client is a browser and/or other interface. The client receives notifications from the task dispatcher and updates an associated user interface (UI) to provide feedback regarding the execution of the tasks. When a task is in progress, the UI cannot be modified by the user, so the user receives feedback from the server but cannot start a new task while there is already a task in progress.

Thus, it can be a problem when multiple users are attempting to execute multiple tasks and are unaware that a task is already in progress on the server. Certain examples provide a technical solution to this problem by improving the server and associated UI functionality to identify executing tasks, track task execution progress, generate a notification of the task execution progress, and regulate processor usage for task execution.

An example process includes submitting a task from a client device/application for execution by a server. The task is accepted by a task manager. The task manager creates an execution context and associates the task with the execution context. The task manager notifies a task dispatcher, which instructs associated clients to block the UI until task execution is complete. Thus, the task dispatcher can manipulate the UI for the submitting client other connected clients to allow interaction with the UI but prohibit changes until the task is finished. While the task is progressing, the task dispatcher notifies associated clients of the task execution status through the execution context, for example. When the task ends, the task dispatcher notifies the server through the execution context how the task was finished (e.g., with failure, with success, etc.). The task dispatcher notifies the clients regarding the change in server status. That is, with the task execution completed, the UI becomes unblocked and available for the next task. The task dispatcher also destroys a thread/Go routine associated with the task as well as the execution context. The server is then ready to accept next task(s).

Rather than hiding long-running tasks behind endpoints with only the server having knowledge of task progress, certain examples provide ongoing information regarding task progress via the execution context and task dispatcher. Further, rather than suffering from a lack of information upon connection timeout or disconnection, certain examples leverage the execution context associated with the task, as managed by the task manager, to maintain current status information with the task dispatcher to relay to client applications/devices/systems/etc.

Previously, tasks were generated in a certain order for a job to be completed. To understand a task status, a call must be sent from a user browser to the server, and the server must then respond with how the task was progressing. In such communication, the browser connects, disconnects, and must then reconnect to the server, requiring repeated user login and connection to restore communication with the server. Additionally, when a second user connected to the server via a second browser, the second browser is unaware that a task is being processed by the server.

Instead, certain examples provide technological improvements to server task processing and status interaction by intercepting a task to be started on the server. A data communication layer or channel (e.g., WebSockets, etc.) is used by a client (e.g., browser, other application, other device, etc.) to connect to the server. When a task is in progress on the server, the server informs the client, through the data communication channel, that the task is in progress and also provides a status of the task execution. Thus, even if a second client (e.g., a second browser, etc.) is launched, the second client can see the task progressing on the server. The client(s) will not be able to access the same task service until the task is complete, but the client(s) can view and receive updates regarding task execution progress at the server, for example.

Figure 2:
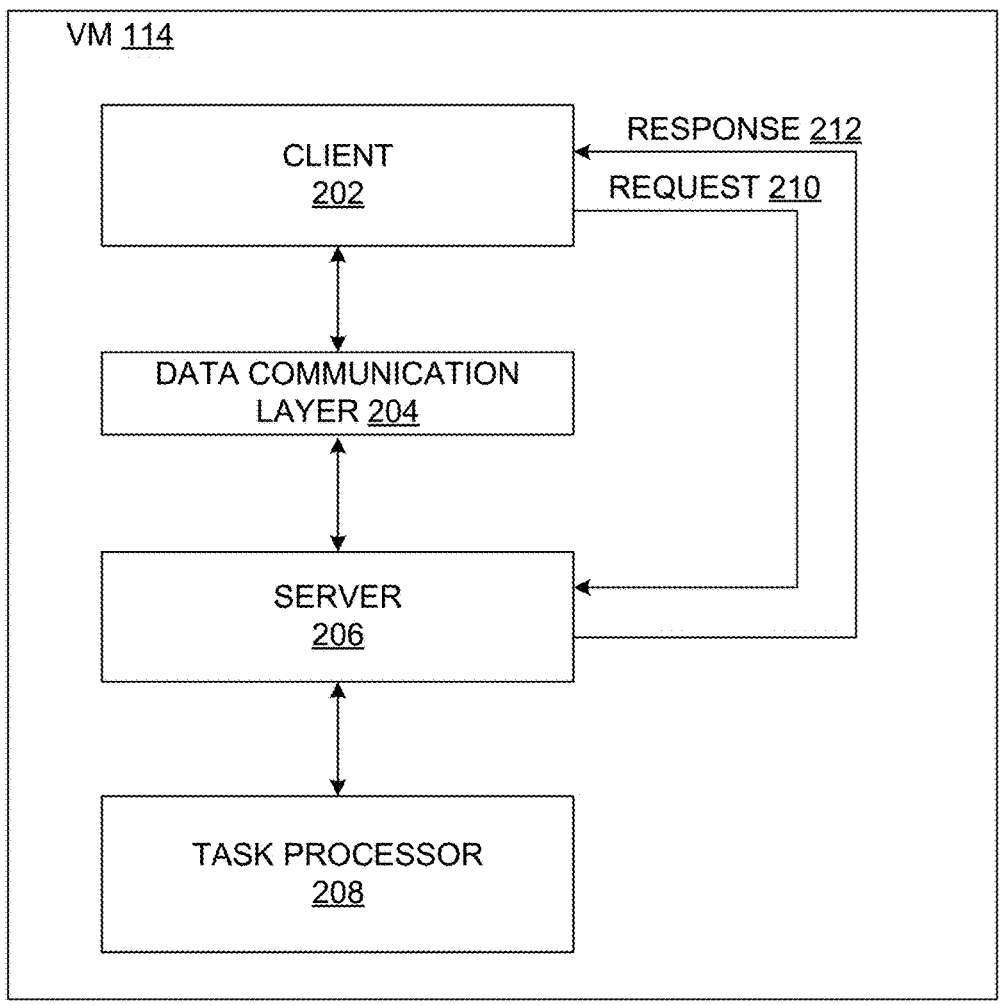
FIG. 2 illustrates an example virtual machine configuration for task processing including a client, a data communication layer, a server, and a task processor.

FIG. 2 illustrates an example virtual machine 114 configuration for task processing including a client 202 (e.g., a web browser, application, system, etc.), a data communication layer 204 (such as a Web Sockets layer, etc.; also referred to as data communication channel 204), a server 206, and a task processor 208. The client 202 sends a request 210 to the server 206 describing a task (e.g., new appliance, change certificate, initiate service, change identity management provider, etc.) to be executed by the server 206. The server 206 responds with message 212 that accepts the task. Through the data communication layer 204, the server 206 provides status information and/or other feedback to the client 202 regarding the task (e.g., status/state of task execution, etc.). The server 206 communicates with the task processor 208, which is responsible for task completion. While the task is processing, the server 206 has access to an execution context which holds information sent by the client 202 and is provided to the task processor 208 which executes the task. The task processor 208 and the server 206 use the execution context to provide feedback regarding how the task is progressing. For example, a message, warning, graphic, etc., can be displayed, logged, and/or otherwise provided to the client 202. When task execution is finished, feedback is provided to the execution context for that task, and the server 206 can leverage the execution context to inform the client 202 about task and provide feedback regarding task execution/completion, for example. Thus, the server 206 can leverage the execution context for a task to provide dynamic, ongoing feedback regarding task progress.

Figure 3:
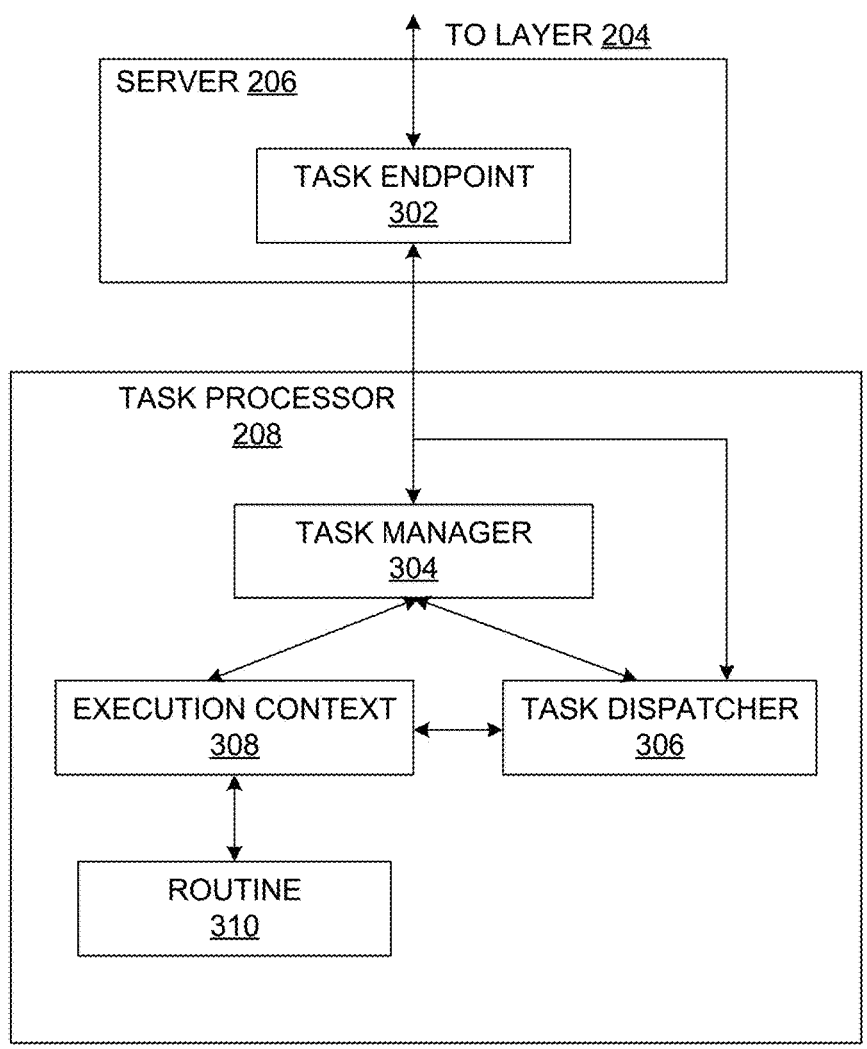
FIG. 3 illustrates an example implementation of the server and task processor of FIG. 2.

FIG. 3 illustrates an example implementation of the server 206 and task processor 208 of FIG. 2. As shown in the example of FIG. 3, the server 206 includes a task endpoint 302 to receive (e.g., through REST calls, etc.) a task submitted by the client 202 for execution by the task processor 208. The task endpoint 302 passes the task to a task manager 304 and/or a task dispatcher 306 and provides access (e.g., through WebSocket, etc.) to the task dispatcher 306.

The task manager 304 accepts the task and notifies a task dispatcher 306 of the task. The task manager 304 creates an execution context 308 for the task and assigns the task to a process or routine 310 to be executed. The task manager 304 can connect the execution context 308 with the task dispatcher 306, for example. In certain examples, the task dispatcher 306 is responsible for dispatching feedback to the client 202 because there could be more than one client 202 assigned to the server 206. Thus, the example task dispatcher 306 receives messages from the tasks sent through the execution context 308 and distributes messages to one or more clients 202 (e.g., the user's browser, etc.) connected to the system (e.g., through WebSocket, etc.).

The example task is a separate thread (or Go routine, in context of vRA implementation, etc.) assigned by the task manager 304 to the task. The task represents work that is to be performed. For each task, a corresponding execution context 308 is created by the task manager 304. The example execution context 308 holds information about data associated with the task and information about progress of the task execution. The execution context 308 provides a messaging layer, which allows the task to notify the task dispatcher 306 about the progress of the task execution and to send feedback to a user and/or other system, such as the client 202.

Thus, certain examples provide server 206 and associated task processor 208 technology to process, monitor, and coordinate tasks in a virtual computing infrastructure. For example, task functionality can be implemented in a configuration interface (e.g., to change hostname, set identity provider, update/upgrade, et.). Tasks can be associated with services that maintain the life cycle of the configuration interface, for example. Task progress can be monitored and shared via the task manager 304, task dispatcher 306, server 206, etc.

Figure 4:
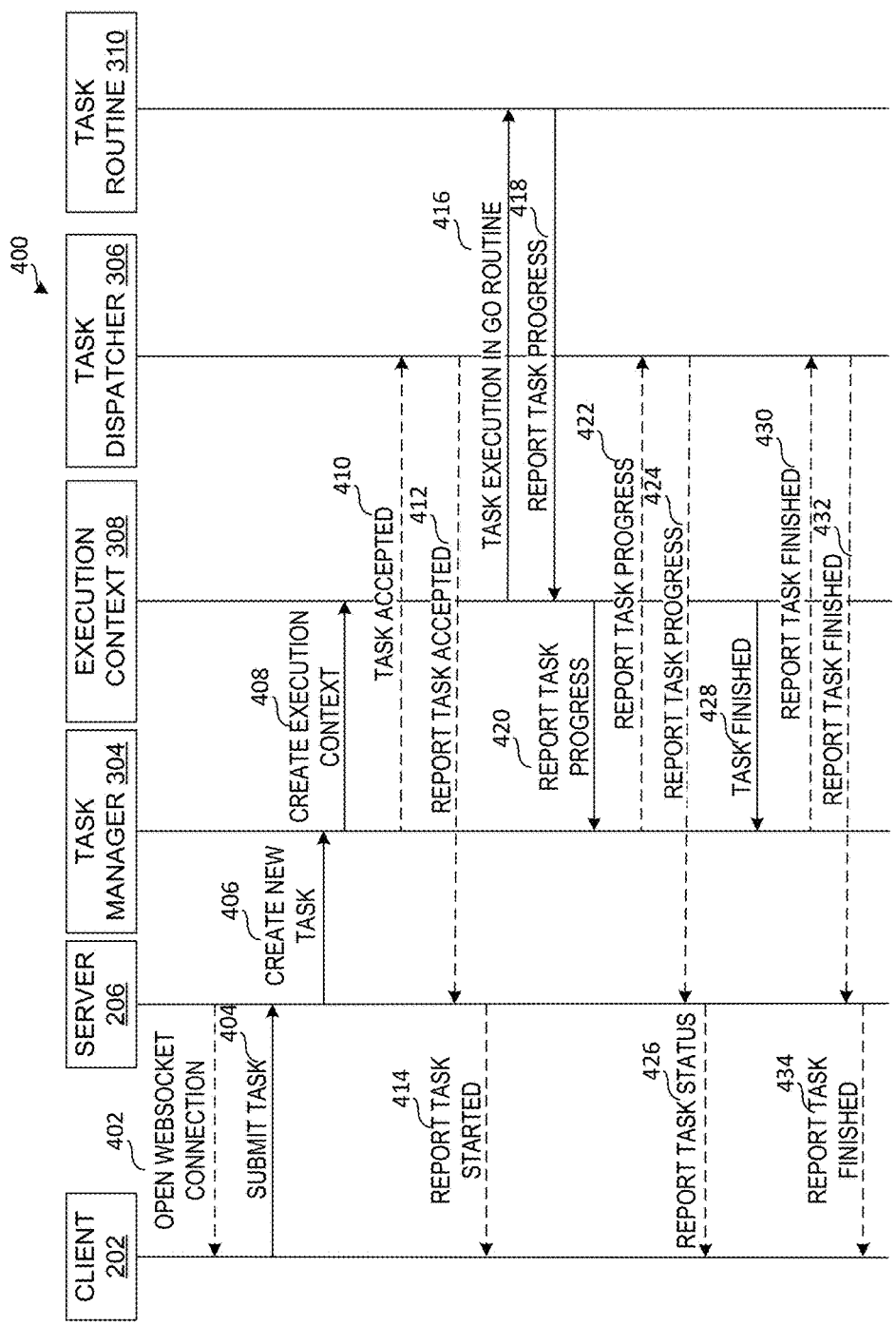
FIG. 4 illustrates an example data flow diagram showing an exchange of information between client, server, and task execution components.

FIG. 4 illustrates an example data flow/sequence 400 for task execution using the server 206 and associated task processor 208. At 402, the server 206 opens a data connection 204 (e.g., a WebSocket connection, etc.) to the client 202. At 404, the client 202 submits a task to the server 406. For example, the client 202 can generate a task such as instantiate a new virtual appliance, change a certificate, initiate a service, change an IDM provider, etc. At 406, the server 206 creates a new task for the task manager 304. At 408, the task manager 304 creates an execution context 308 for the task.

At 410, the task is accepted by the task dispatcher 306. At 412, the task dispatcher 306 reports task acceptance to the server 206. At 414, the server 206 reports to the client 202 that the task has begun.

At 416, the execution context 308 spawns an execution routine 310 for the task. At 418, the routine 310 reports back its task progress to the execution context 308. At 420, the execution context 308 provides a report on task progress to the task manager 304. At 422, the task manager 304 confirms task progress with the task dispatcher 306, and, at 424, the task dispatcher 306 reports task progress to the server 206. At 426, the server 206 reports task progress to the client 202.

At 428, the execution context 308 reports task completion to the task manager 304. At 430, the task manager 304 reports task completion to the task dispatcher 306. At 432, the task dispatcher 306 reports task completion to the server 206, which, at 434, informs the client 202 that the task has finished.

While example implementations of the example cloud computing system 100 and virtual machine installation 114 are illustrated in FIGS. 1-4, one or more of the elements, processes and/or devices illustrated in FIGS. 1-4 may be combined, divided, re-arranged, omitted, eliminated and/or implemented in any other way. Further, the example client 202, data communication layer 204, server 206, task processor 208, task endpoint 302, task manager 304, task dispatcher 306, execution context 308, and/or, more generally, the example systems 100 and/or 400 of FIGS. 1-4 can be implemented by hardware, software, firmware and/or any combination of hardware, software and/or firmware. Thus, for example, any of the example client 202, data communication layer 204, server 206, task processor 208, task endpoint 302, task manager 304, task dispatcher 306, execution context 308, and/or, more generally, the example systems 100 and/or 400 of FIGS. 1-4 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example client 202, data communication layer 204, server 206, task processor 208, task endpoint 302, task manager 304, task dispatcher 306, execution context 308, and/or, more generally, the example systems 100 and/or 400 of FIGS. 1-4 is/are hereby expressly defined to include a tangible computer readable storage device or storage disk such as a memory, a digital versatile disk (DVD), a compact disk (CD), a Blu-ray disk, etc. storing the software and/or firmware. Further still, the example client 202, data communication layer 204, server 206, task processor 208, task endpoint 302, task manager 304, task dispatcher 306, execution context 308, and/or, more generally, the example systems 100 and/or 400 of FIGS. 1-4 may include one or more elements, processes and/or devices in addition to, or instead of, those illustrated in FIGS. 1-4, and/or may include more than one of any or all of the illustrated elements, processes and devices.

Figure 5:
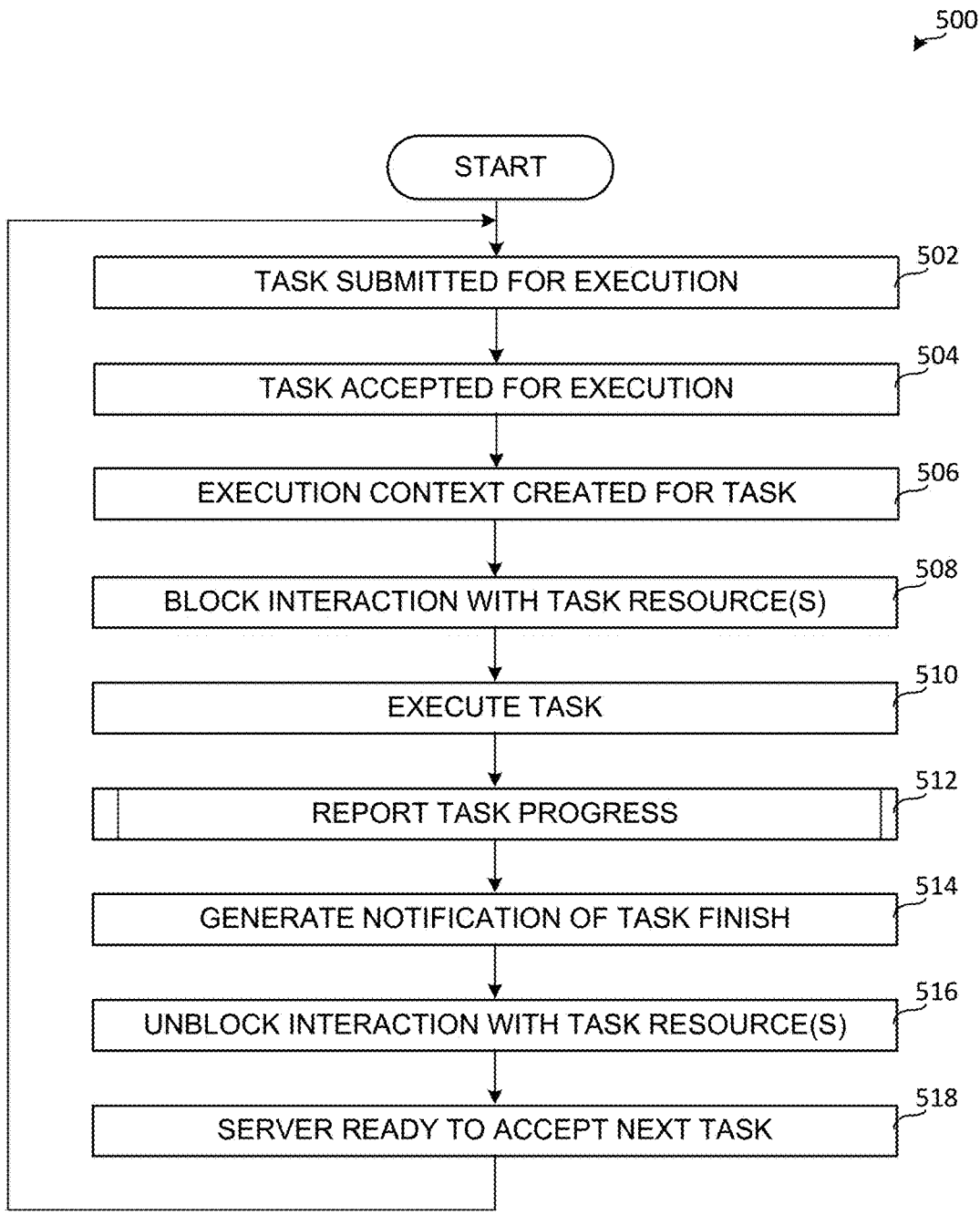
FIGS. 5-6 depict flowcharts representative of computer readable instructions that may be executed to implement the example task execution of FIGS. 1-4.
Figure 6:
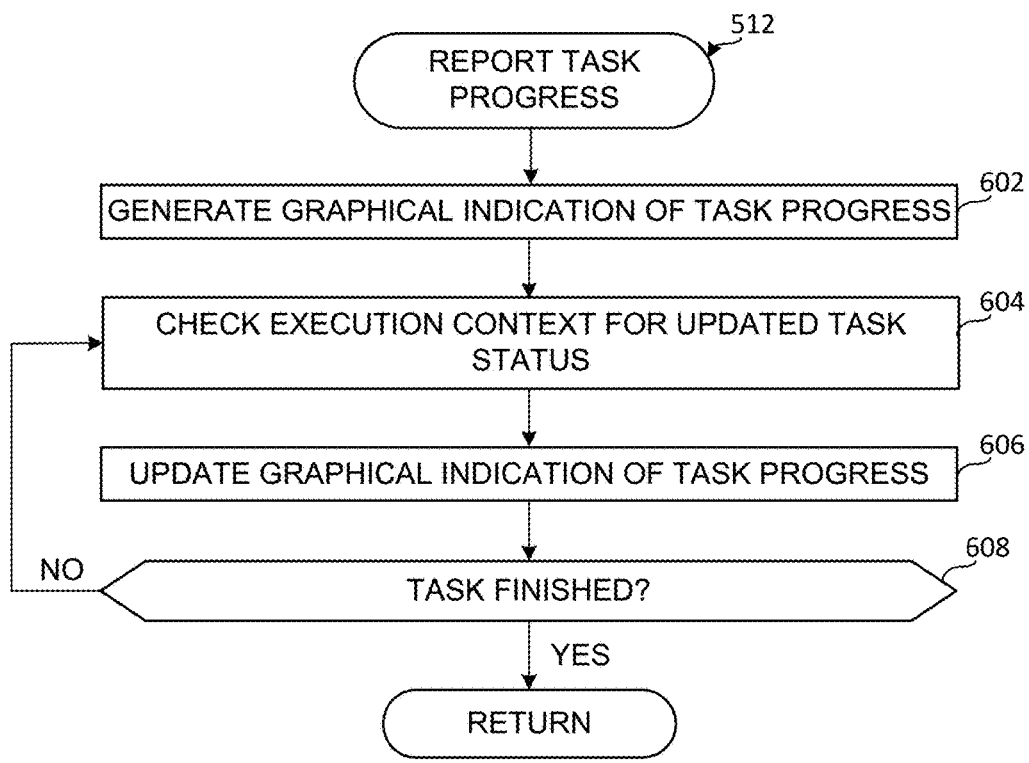

Flowcharts representative of example machine readable instructions that may be executed to deploy and manage the example client 202, data communication layer 204, server 206, task processor 208, task endpoint 302, task manager 304, task dispatcher 306, execution context 308, and/or, more generally, the example systems 100 and/or 400 of FIGS. 1-4 are shown in FIGS. 5-6. In these examples, the machine readable instructions implement programs for execution by a processor such as the processor 1212 shown in the example processor platform 1200 discussed below in connection with FIG. 12. The programs may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowcharts illustrated in FIGS. 5-6, many other methods of deploying, managing, and updating workload domains in accordance with the teachings of this disclosure may alternatively be used. For example, the order of execution of the blocks may be changed, and/or some of the blocks described may be changed, eliminated, or combined.

As mentioned above, the example processes of FIGS. 5-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 5-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 5 depicts a flowchart representative of computer readable instructions that may be executed to implement the example task management of FIGS. 1-4. An example program 500 is illustrated in FIG. 5. Initially, at block 502, the client 202 submits a task to the server 206. For example, the client 202 submits a request to initiate a service, change a certificate, install a new virtual appliance, change a service provider, etc., to the server 206.

At block 504, the task is accepted by the task manager 304. For example, the task manager 304 acknowledges to the server 206 that the task has been accepted and is to be executed. The task can be associated with an identifier to identify the task and its relationship to the client 202 and/or server 206, for example. At block 506, the task manager 304 creates an execution context 308 for the task. For example, the execution context 308 defines an environment in which the task is to execute. The execution context 308 includes information sent from the client 202 and the server 206 to the task manager 304 regarding the task to be executed. In certain examples, the execution context 308 includes context data provided by the client 202 and/or server 206 and passed along to the task manager 304 with the request for task execution, as well as authentication/security context and data. The execution context 308 is leveraged by the routine 310 in executing the task via the task processor 208, for example.

In certain examples, the execution context 308 can be leveraged by the task and the task manager 304 to provide feedback regarding task progress. For example, the execution context 308 can be leveraged to display a warning, message, etc., to the client 202 via the server 206. When the task is finished, the same context 308 provides feedback based on information provided by the task, routine 310, etc., to the context 308. The task manager 304 can provide feedback from the execution context 308 to the server 206, which can then provide feedback to the client 202.

At block 508, interaction with one or more resources to execute the task is blocked. For example, the task dispatcher 306 is notified of the task execution by the task manager 304, and the task dispatcher 306 notifies clients 202 to block the graphical user interface (GUI) associated with execution of task resources until the task execution is completed. Thus, for example, the client 202 and other connected clients block their GUIs such that users can interact with the GUI but cannot make changes while the task is executing.

At block 510, the task is executed. For example, the execution context 308 generates a routine 310 to execute the task. The task executes according to the routine 310 using the resources of the task processor 208, for example. For example, a service is initiated on the VM 114 via the task processor 208, a new virtual appliance is spawned via the task processor 208 on the VM 114, etc.

At block 512, task progress is reported. For example, the task provides status/progress updates through the execution context 308. The task dispatcher 306 reports task progress to the server 206, and the server 206 reports task status to the client 202. In certain examples, a graphical display of task status is provided. FIGS. 7-11 described below provide examples of a graphical user interface (GUI) indication of task status, for example.

At block 514, a notification of task finish is generated. For example, the task notifies the execution context 308 of task finish along with an indication of how the task finished (e.g., success, failure, etc.). The task dispatcher 306 notifies the server 206, which notifies client(s) 202, regarding the task finish.

At block 516, interaction with one or more resources used to execute the task is unblocked. For example, once the client 202 has been notified that the task has been finished, the client 202 can be instructed to release the block of the GUI associated with the execution of task resources so that other tasks can be executed via the GUI.

At block 518, the server 206 is ready to accept a new task. For example, the task dispatcher 306 destroys the execution context 308 associated with the finished task, as well as the routine 310 associated with task execution. Control reverts to block 502 to accept a next task.

The flow diagram of FIG. 6 provides further detail regarding reporting of task progress at block 512 in the example of FIG. 5. At block 602, based on task execution by the routine 310 in the execution context 308, a graphical indication of task progress is generated. For example, the task dispatcher 306 can generate a graphical indication of task progress for the server 206, which can relay the graphical indication for display at the client 202. In other examples, the task dispatcher 306 provides information from the execution context 308 to the server 206, and the server 206 generates the graphical indication for display at the client 202. The graphical indication can include information regarding the task being executed, resource(s) being used for the task execution, progress (e.g., percentage, time remaining, milestone, etc.) of the task execution, etc. In certain examples, the progress report can include a log and/or other data file, status parameter, etc., instead of or in addition to the graphical indication.

At block 604, the execution context 308 is checked to determine an updated task execution status. For example, the execution context 308 can query the task routine 310 and provide an updated execution status to the task manager 304, which updates the task dispatcher 306 to provide an update to the server 206 and then the client 202. Based on the updated task status, at block 606, the graphical indication of task status is updated. For example, task progress may have advanced from 0% to 60%, and the graphical indication can be updated to reflect that change.

At block 608, the task is evaluated to determine if the task is finished. If the updated status indicates that the task has finished, then control reverts to block 514 to generate a notification of task finish. However, if the task has not finished, then control reverts to block 604 to check for an updated task status.

Figure 7:
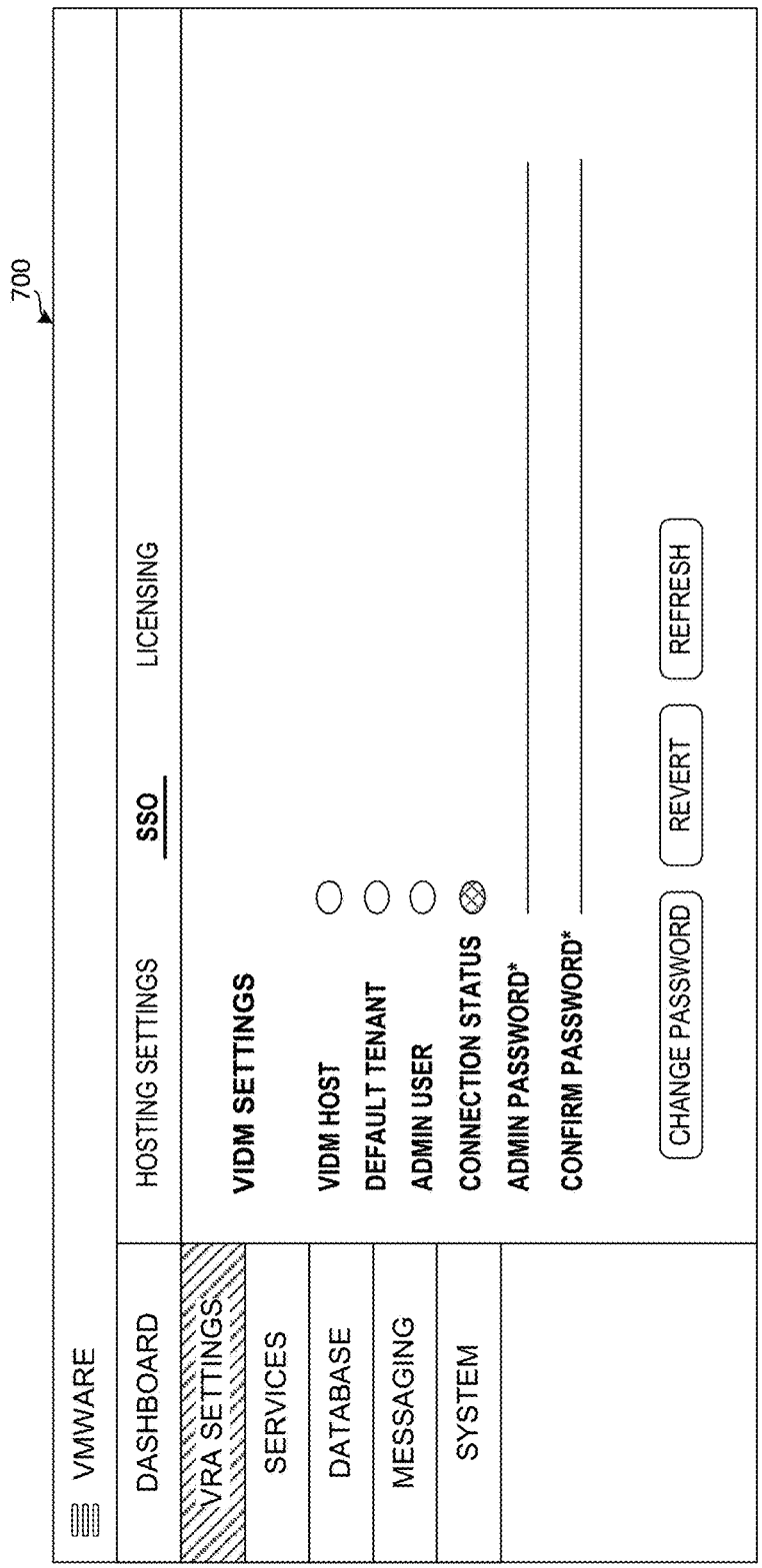
FIGS. 7-11 show example user interfaces including graphical indications of task execution progress.
Figure 8:
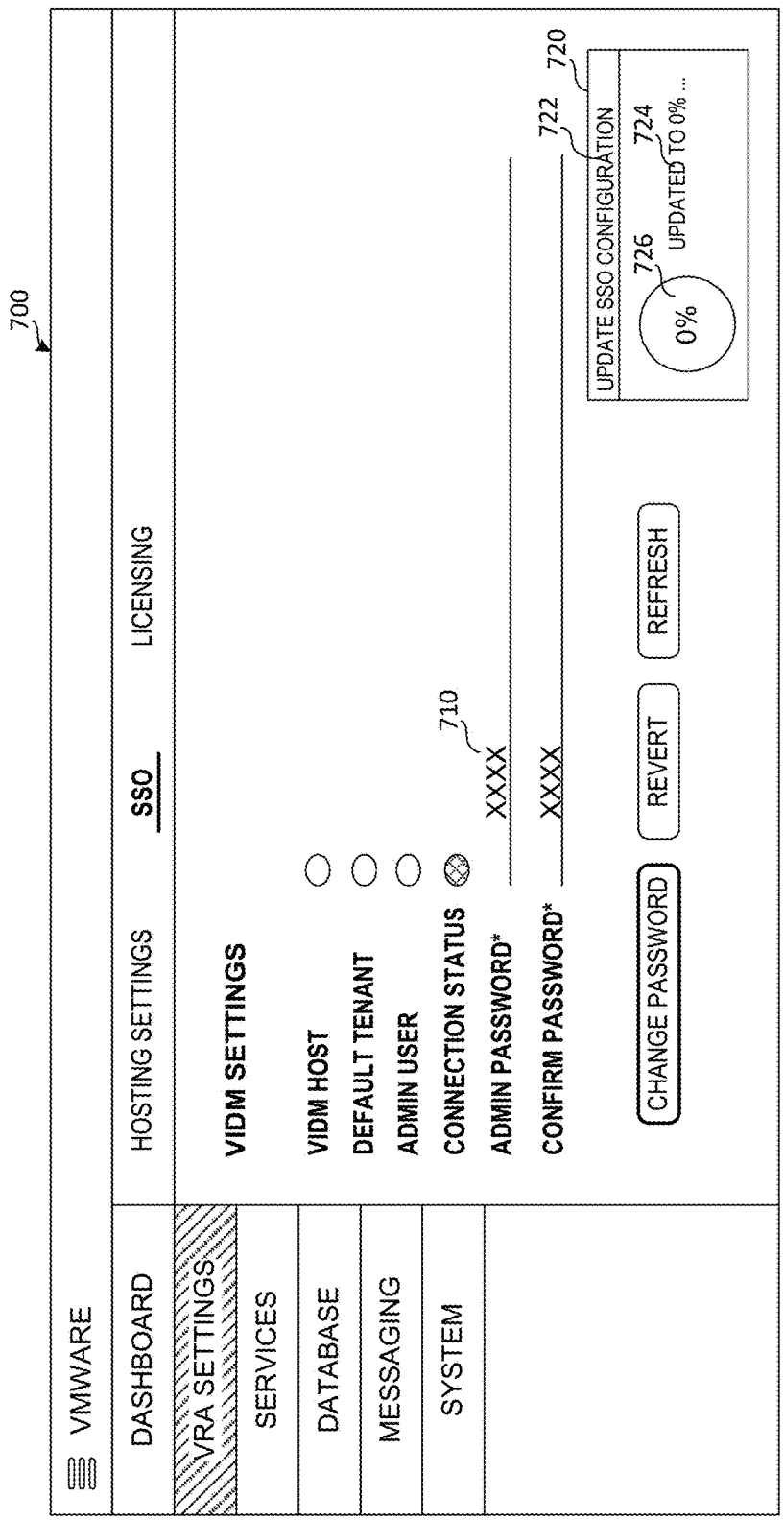
Figure 9:
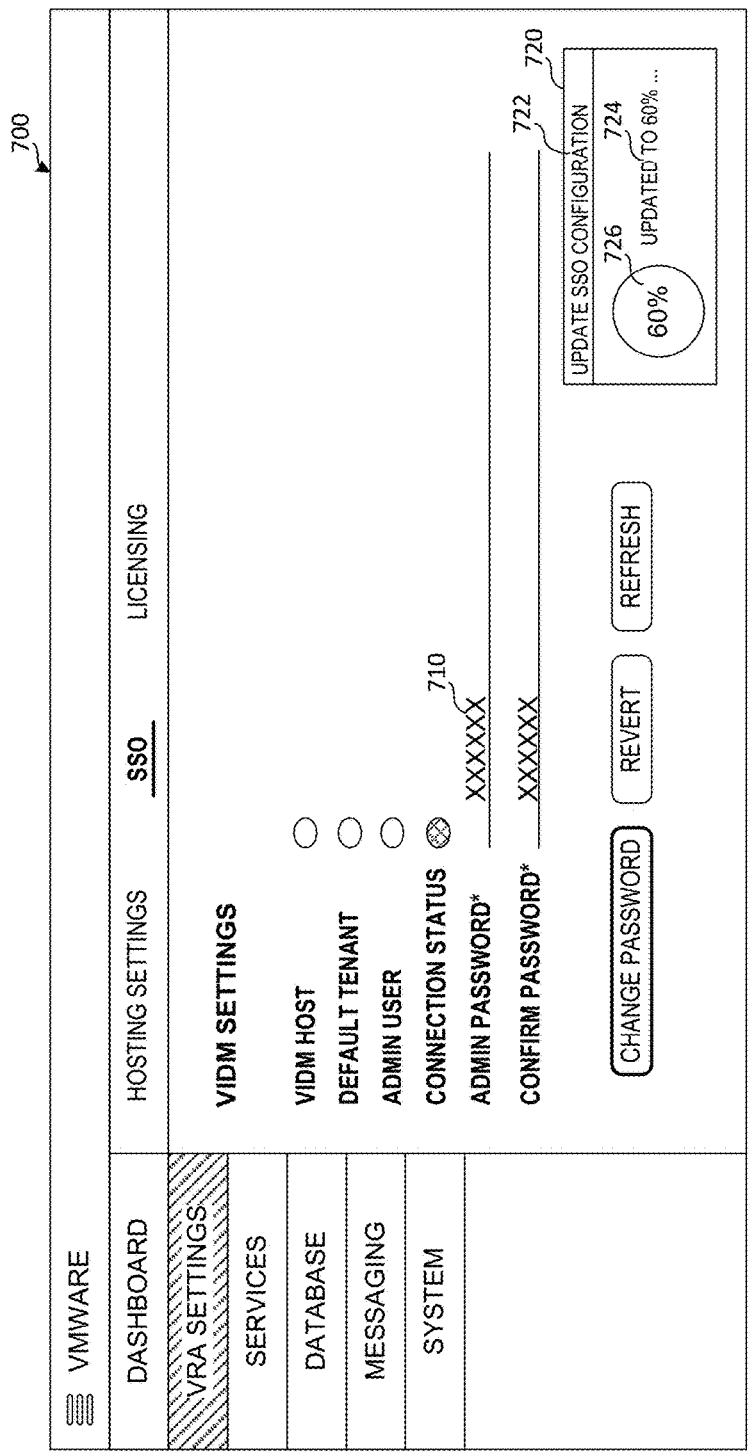

FIGS. 7-11 illustrate example GUIs including a graphical indication of task execution status according to the system of FIGS. 1-3, data flow of FIG. 4, and methods of FIGS. 5-6. FIG. 7 illustrates an example SSO configuration interface 700. FIG. 8 illustrates the example interface 700 in which the administrator password 710 is being changed. As shown in the example of FIG. 8, a graphical indication 720 provides a status of the password change task. As illustrated in the example of FIG. 8, the graphical indication 720 identifies the task 722 being executed and provides one or more indicators 724, 726 of task execution progress. FIG. 9 provides an example of an updated indication 720 of task 722 execution progress 724, 726 (e.g., task progress 724, 276 at 60%).

Figure 10:
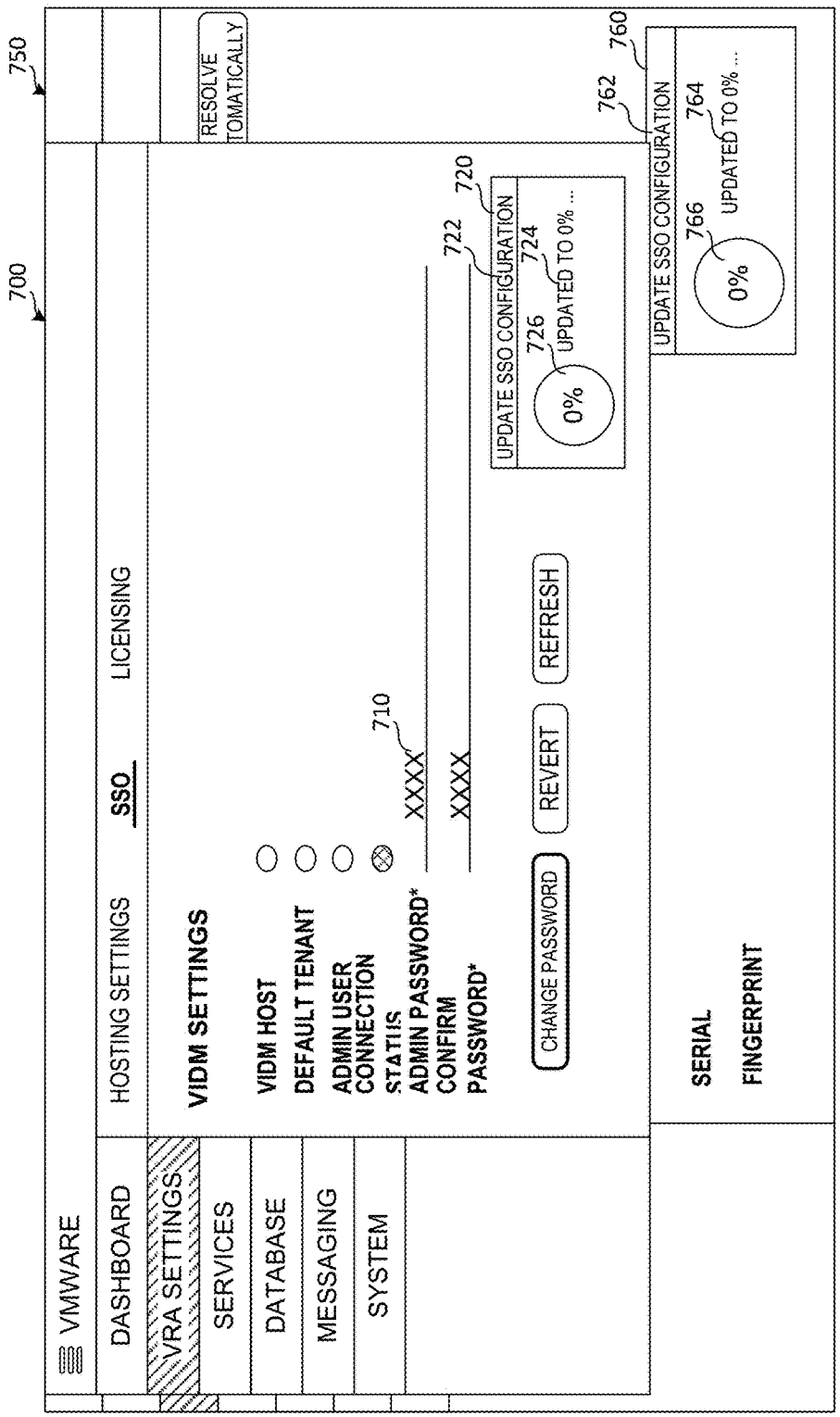
Figure 11:
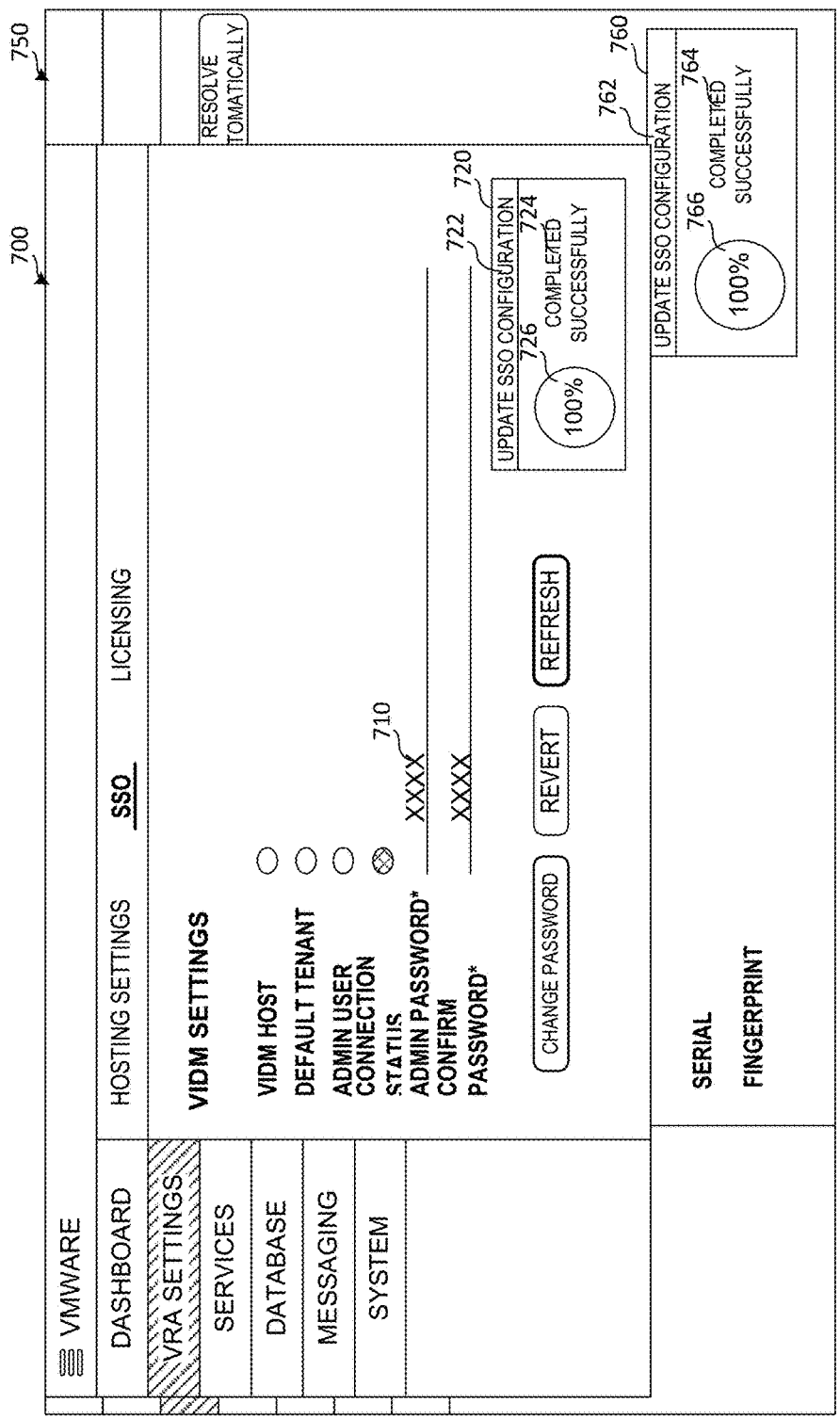

FIG. 10 illustrates an example of the interface 700 displayed in conjunction with a second interface window 750. As shown in the example of FIG. 10, the graphical indication 720 is mirrored by a corresponding graphical indication 760 in the second interface 750. The graphical indication 760 identifies the task 762 being executed and provides one or more indicators 764, 766 of task execution progress corresponding to the indicators 722, 724, 726 of the graphical indicator 720. FIG. 11 provides another view of the example interfaces 700, 750 showing a task status of task completion in both indications 720, 760 (e.g., task progress 724, 726, 764, 766 at 100%).

Figure 12:
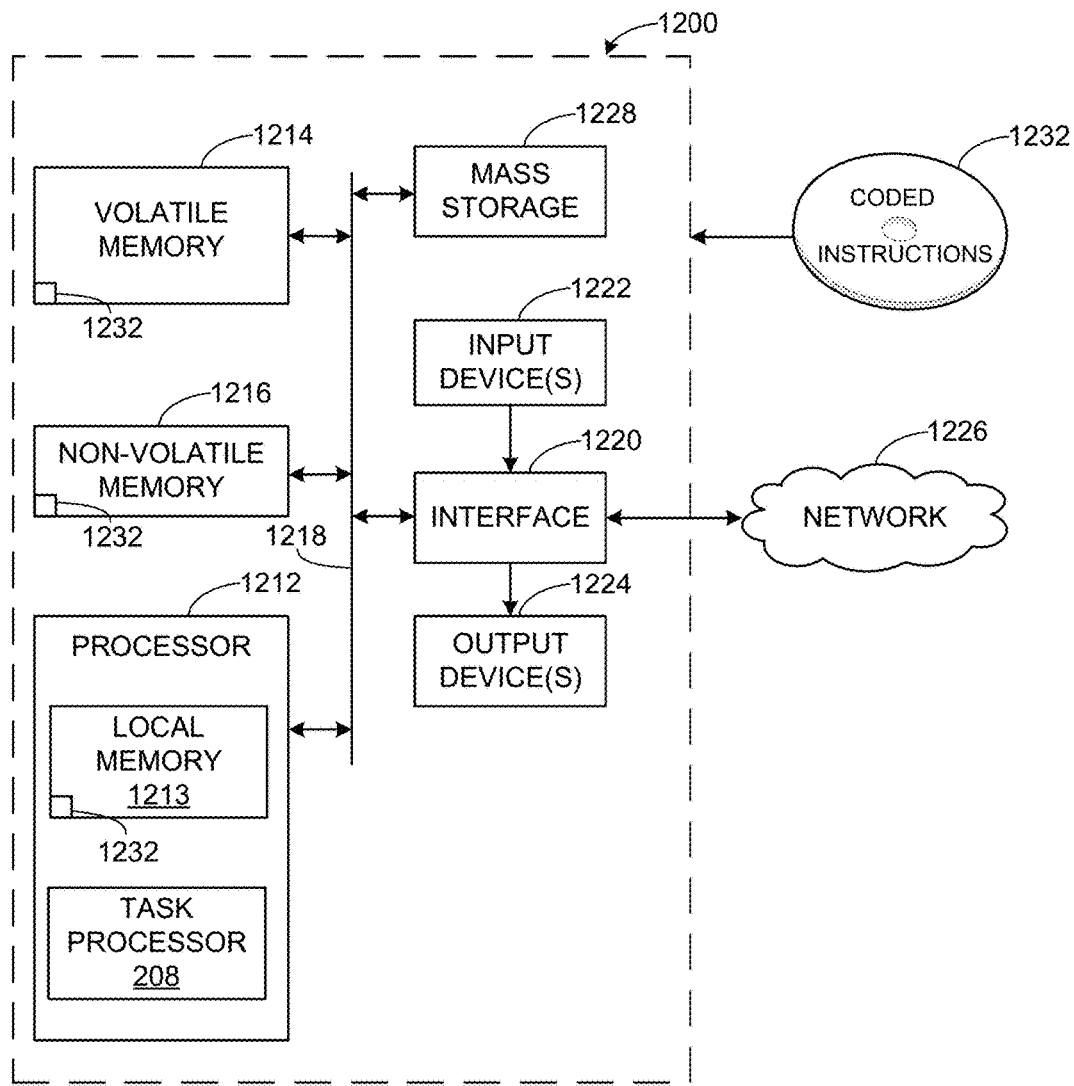
FIG. 12 is a block diagram of an example processing platform capable of executing the example machine-readable instructions of FIGS. 5-6 to implement the systems and data flows of FIGS. 1-4.

FIG. 12 is a block diagram of an example processor platform 1200 capable of executing the instructions of FIGS. 5-6 to implement the example systems, operation, and management of FIGS. 1-5. The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache), and executes instructions to implement the example system 100 or portions thereof, such as the task processor 208 and/or its component task manager 304, task dispatcher 306, etc. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include flash devices, floppy disk drives, hard drive disks, optical compact disk (CD) drives, optical Blu-ray disk drives, RAID systems, and optical digital versatile disk (DVD) drives.

Coded instructions 1232 representative of the example machine readable instructions of FIGS. 5-6 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture facilitate cloning an agent in a distributed environment such as a cloud computing environment and management of agents in the distributed environment. Examples disclosed herein facilitate self-evaluation and registration of cloned servers and agents without further user intervention or cloud oversight.

An example apparatus includes a task manager and a task dispatcher in a virtual machine. The example task manager is to receive a task and create an execution context for the task, the execution context to associate the task with a routine for task execution. The example task dispatcher is to receive a report of task execution progress and provide an update regarding task execution progress, the task dispatcher, upon initiation of task execution, to facilitate blocking of interaction with a resource involved in the task execution. The example task dispatcher is to trigger an indication of task execution progress and, upon task finish, facilitate unblocking of the resource involved in the task execution.

In some examples, the resource includes a graphical user interface. In some examples, the indication includes a graphical display identifying the task and providing a visible indicator of task progress. In some examples, the graphical display is to be updated based on an update from the task dispatcher regarding task execution progress. In some examples, the task manager is to be triggered by a server to create the execution context in response to receiving the task for execution from a client. In some examples, the server includes a task endpoint to receive the task. In some examples, the server is to communicate with the client via a data communication layer.

An example computer readable storage medium includes instructions. The example instructions, when executed, cause a machine to at least create, in a virtual machine, an execution context for a received task, the execution context to associate the task with a routine for task execution. The example instructions, when executed, cause the machine to at least, upon initiation of task execution, facilitate blocking of interaction with a resource involved in the task execution. The example instructions, when executed, cause the machine to at least receive a report of task execution progress and trigger display of an indication of task execution progress. The example instructions, when executed, cause the machine to at least upon task finish, facilitate unblocking of the resource involved in the task execution.

In some examples, the resource includes a graphical user interface. In some examples, the indication includes a graphical display identifying the task and providing a visible indicator of task progress. In some examples, the instructions, when executed, further cause the machine to update the graphical display based on an update from a task dispatcher regarding task execution progress. In some examples, the instructions, when executed, further cause the machine to trigger a task manager to create the execution context in response to receiving the task for execution from a client. In some examples, the machine communicates with the client via a data communication layer.

An example method includes creating, in a virtual machine using at least one processor, an execution context for the task, the execution context to associate the task with a routine for task execution. The example method includes, upon initiation of task execution, facilitating, using the at least one processor, blocking of interaction with a resource involved in the task execution. The example method includes receiving, using the at least one processor, a report of task execution progress and trigger display of an indication of task execution progress. The example method includes, upon task finish, facilitating, using the at least one processor, unblocking of the resource involved in the task execution.

In some examples, the resource includes a graphical user interface. In some examples, the indication includes a graphical display identifying the task and providing a visible indicator of task progress. In some examples, the method further includes updating the graphical display based on an update from the task dispatcher regarding task execution progress. In some examples, creating the execution context is triggered in response to receiving the task at a server for execution from a client. In some examples, the server includes a task endpoint to receive the task. In some examples, the server is to communicate with the client via a data communication layer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory; and
   at least one processor to implement:
   a task manager in a virtual machine to receive a task and create an execution context for the task, the execution context to associate the task with a routine for task execution; and
   a task dispatcher in the virtual machine to receive a report of task execution progress and provide an update regarding task execution progress, the task dispatcher, upon initiation of task execution, to facilitate blocking of interaction with a resource involved in the task execution, the task dispatcher to trigger an indication of task execution progress and, upon task finish, facilitate unblocking of the resource involved in the task execution.

2. The apparatus of claim 1, wherein the resource includes a graphical user interface.

3. The apparatus of claim 2, where the indication includes a graphical display identifying the task and providing a visible indicator of task progress.

4. The apparatus of claim 3, wherein the graphical display is to be updated based on an update from the task dispatcher regarding task execution progress.

5. The apparatus of claim 1, wherein the task manager is to be triggered by a server to create the execution context in response to receiving the task for execution from a client.

6. The apparatus of claim 5, wherein the server includes a task endpoint to receive the task.

7. The apparatus of claim 5, wherein the server is to communicate with the client via a data communication layer.

8. A non-transitory computer readable storage medium comprising instructions that, when executed, cause a machine to at least:
   create, in a virtual machine, an execution context for a received task, the execution context to associate the task with a routine for task execution;
   upon initiation of task execution, facilitate blocking of interaction with a resource involved in the task execution;
   receive a report of task execution progress and trigger display of an indication of task execution progress; and
   upon task finish, facilitate unblocking of the resource involved in the task execution.

9. The storage medium of claim 8, wherein the resource includes a graphical user interface.

10. The storage medium of claim 9, where the indication includes a graphical display identifying the task and providing a visible indicator of task progress.

11. The storage medium of claim 10, where in the instructions, when executed, further cause the machine to update the graphical display based on an update from a task dispatcher regarding task execution progress.

12. The storage medium of claim 8, wherein the instructions, when executed, further cause the machine to trigger a task manager to create the execution context in response to receiving the task for execution from a client.

13. The storage medium of claim 12, wherein the machine communicates with the client via a data communication layer.

14. A method comprising:
   creating, in a virtual machine using at least one processor, an execution context for a task, the execution context to associate the task with a routine for task execution;
   upon initiation of task execution, facilitating, using the at least one processor, blocking of interaction with a resource involved in the task execution;
   receiving, using the at least one processor, a report of task execution progress and trigger display of an indication of task execution progress; and
   upon task finish, facilitating, using the at least one processor, unblocking of the resource involved in the task execution.

15. The method of claim 14, wherein the resource includes a graphical user interface.

16. The method of claim 15, where the indication includes a graphical display identifying the task and providing a visible indicator of task progress.

17. The method of claim 16, further including updating the graphical display based on an update regarding task execution progress.

18. The method of claim 14, wherein creating the execution context is triggered in response to receiving the task at a server for execution from a client.

19. The method of claim 18, wherein the server includes a task endpoint to receive the task.

20. The method of claim 18, wherein the server is to communicate with the client via a data communication layer.

* * * * *